US010240777B2

(12) United States Patent
Silversand

(10) Patent No.: US 10,240,777 B2
(45) Date of Patent: Mar. 26, 2019

(54) PLATE HEAT EXCHANGER PLATE FOR A PLATE HEAT EXCHANGER AND A PLATE HEAT EXCHANGER COMPRISING SUCH PLATES

(71) Applicant: HeatCore AB, Lund (SE)

(72) Inventor: Fredrik Silversand, Löddeköpinge (SE)

(73) Assignee: HEATCORE AB, Lund (SE)

( * ) Notice: Subject to any disclaimer, the term of this patent is extended or adjusted under 35 U.S.C. 154(b) by 406 days.

(21) Appl. No.: 14/432,021

(22) PCT Filed: Oct. 30, 2013

(86) PCT No.: PCT/SE2013/051267
§ 371 (c)(1),
(2) Date: Mar. 27, 2015

(87) PCT Pub. No.: WO2014/070088
PCT Pub. Date: May 8, 2014

(65) Prior Publication Data
US 2015/0285560 A1    Oct. 8, 2015

(30) Foreign Application Priority Data

Nov. 2, 2012  (SE) ........................... 1251246

(51) Int. Cl.
*F28D 1/03*    (2006.01)
*F28D 9/00*    (2006.01)
(Continued)

(52) U.S. Cl.
CPC ............... *F23C 13/00* (2013.01); *F23C 3/00* (2013.01); *F23C 5/02* (2013.01); *F23C 5/08* (2013.01);
(Continued)

(58) Field of Classification Search
CPC ...... F28D 9/0012; F28D 9/005; F28D 9/0006; F28D 1/0333; F28D 9/0043;
(Continued)

(56) References Cited

U.S. PATENT DOCUMENTS 2,251,066 A    7/1941  Persson et al.
2,348,020 A *  5/1944  Norris .................. F28D 9/0012
                                           165/167

(Continued)

FOREIGN PATENT DOCUMENTS

EP   1647793   4/2006
GB   1371277   10/1974
(Continued)

OTHER PUBLICATIONS

International Search Report for PCT/SE2013/051267 dated Apr. 28, 2014.
(Continued)

*Primary Examiner* — Leonard R Leo
(74) *Attorney, Agent, or Firm* — Gottlieb, Rackman & Reisman, P.C.

(57) ABSTRACT

A heat exchanger plate for a plate heat exchanger (12) includes a first side, a second side and a center point (P) through which an imaginary center axis (A) extends in a direction perpendicular to a plane of the plate. The plate comprises a first port for a first medium, and at least a second port and a third port for a second medium. The plate further comprises a first sealing arranged on the second side around the first port, a second sealing arranged on the second side at a circumference of the plate, and a closed third sealing arranged between the first and second sealings to form a first heat transfer area and a second heat transfer area separated
(Continued)

Figure 1:
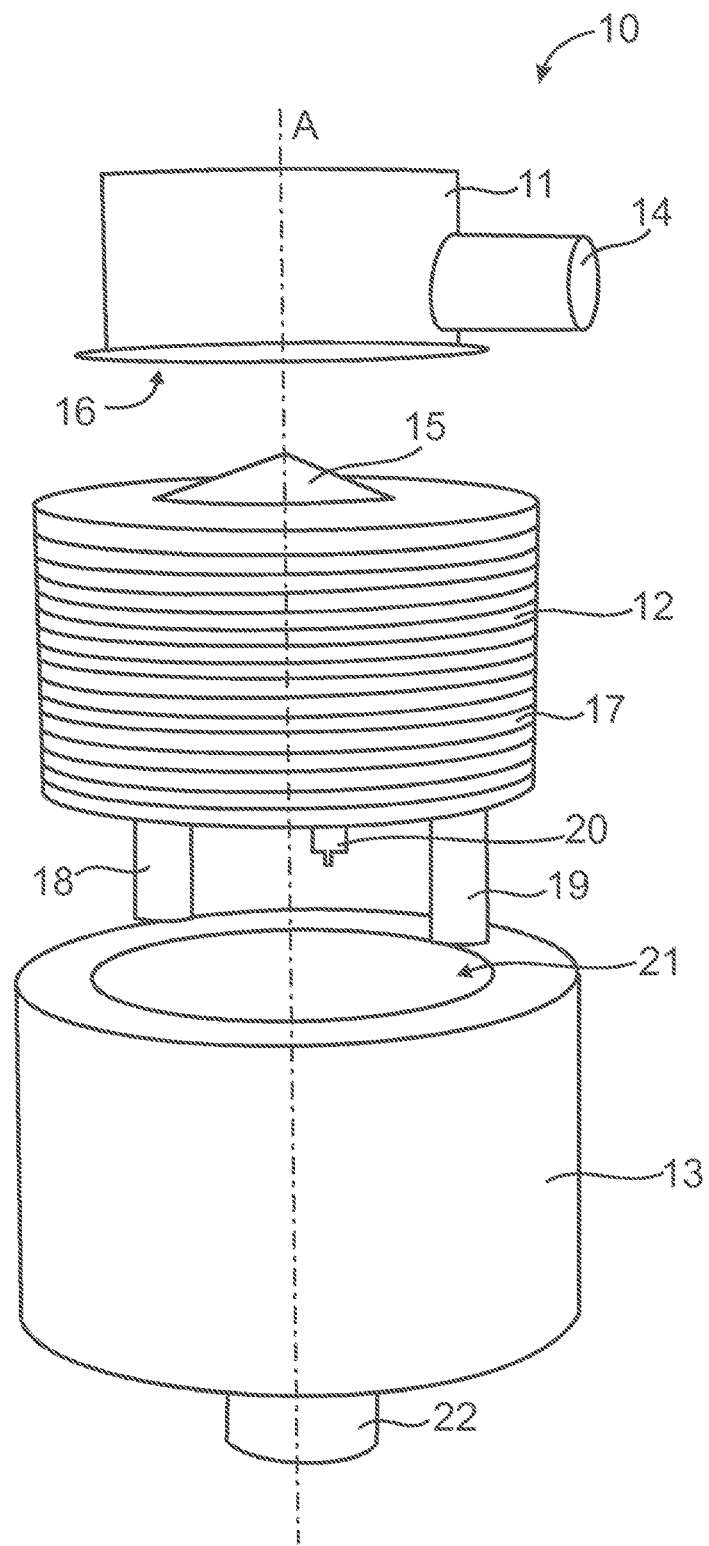

from the first heat transfer area. The second port is arranged in the first heat transfer area and the third port is arranged in the second heat transfer area.

8 Claims, 9 Drawing Sheets

(51) Int. Cl.
| | |
|---|---|
| F28F 3/08 | (2006.01) |
| F23C 13/00 | (2006.01) |
| F23C 5/08 | (2006.01) |
| F23D 14/00 | (2006.01) |
| F24H 1/00 | (2006.01) |
| F24H 1/38 | (2006.01) |
| F24H 1/43 | (2006.01) |
| F24H 1/48 | (2006.01) |
| F28D 21/00 | (2006.01) |
| F23C 5/02 | (2006.01) |
| F24H 1/32 | (2006.01) |
| F23C 3/00 | (2006.01) |
| F23D 14/02 | (2006.01) |
| F23D 14/66 | (2006.01) |
| F23C 7/00 | (2006.01) |
| F23C 9/00 | (2006.01) |
| F24D 3/08 | (2006.01) |

(52) U.S. Cl.
CPC ............... *F23C 7/00* (2013.01); *F23D 14/00* (2013.01); *F23D 14/02* (2013.01); *F23D 14/66* (2013.01); *F24H 1/0045* (2013.01); *F24H 1/32* (2013.01); *F24H 1/38* (2013.01); *F24H 1/43* (2013.01); *F24H 1/48* (2013.01); *F28D 1/0333* (2013.01); *F28D 9/0012* (2013.01); *F28D 9/0043* (2013.01); *F28D 21/0007* (2013.01); *F28F 3/086* (2013.01); *F23C 9/00* (2013.01); *F23C 2900/13001* (2013.01); *F23D 2900/00003* (2013.01); *F24D 3/08* (2013.01); *Y02E 20/348* (2013.01)

(58) Field of Classification Search
CPC ........ F28D 21/0007; F28F 3/086; F23C 9/00; F24H 1/32; F24H 1/38; F24H 1/0045

USPC .................................................. 165/167, 916
See application file for complete search history.

(56) References Cited

U.S. PATENT DOCUMENTS

| | | | | |
|---|---|---|---|---|
| 3,865,185 | A * | 2/1975 | Ostbo ...................... | F28F 3/086 165/167 |
| 4,742,866 | A * | 5/1988 | Yamanaka ............ | F28D 9/0012 165/167 |
| 5,685,368 | A * | 11/1997 | Yuasa ................... | F28D 9/0012 165/167 |
| 5,954,126 | A * | 9/1999 | Armbruster ........... | F28D 9/0012 165/167 |
| 6,170,568 | B1 * | 1/2001 | Valenzuela ........... | F28D 9/0012 165/167 |
| 6,199,626 | B1 * | 3/2001 | Wu ........................ | F28D 9/0012 165/167 |
| 6,446,712 | B1 * | 9/2002 | Wu ........................ | F28D 9/0012 165/167 |
| 6,863,122 | B2 * | 3/2005 | St. Pierre ................ | F28D 9/005 165/167 |
| 2002/0000310 | A1 | 1/2002 | Cheadle | |
| 2003/0183374 | A1 | 10/2003 | Voss et al. | |
| 2011/0146952 | A1 | 6/2011 | Beldring | |
| 2011/0303400 | A1 | 12/2011 | Scearce | |
| 2012/0055421 | A1 | 3/2012 | Rausch | |

FOREIGN PATENT DOCUMENTS

| | | |
|---|---|---|
| JP | S48-36754 | 5/1973 |
| JP | H02-169907 | 6/1990 |
| JP | H11-270808 | 5/1999 |
| JP | 2004251579 | 9/2004 |
| WO | 0250480 | 6/2002 |

OTHER PUBLICATIONS

EP Search Report and Office Action for Corresponding EP Application EP 13 85 2324 dated May 13, 2016.
JP Office Action and Translation dated Oct. 11, 2017 for Corresponding Application JP 2015-540635.

* cited by examiner

PLATE HEAT EXCHANGER PLATE FOR A PLATE HEAT EXCHANGER AND A PLATE HEAT EXCHANGER COMPRISING SUCH PLATES

This application is the U.S. National Stage Application of PCT/SE2013/051267 filed Oct. 30, 2013, which dams priority from Swedish patent application SE 1251246-3 filed Nov. 2, 2012.

FIELD OF THE INVENTION

The present invention relates to a heat exchanger plate for a plate heat exchanger. Further, the invention relates to a plate heat exchanger comprising a plurality of such heat exchanger plates. Heat exchangers are used for transferring thermal energy from a first medium to a second medium, such as for recovering heat from the first medium. One type of heat exchangers comprises a plurality of heat exchanger plates in the form of a plate package arranged in a shell to form a so called plate and shell heat exchanger.

The invention also relates to a device for heating, comprising a burner and a plate heat exchanger for recovering thermal energy from combustion gases produced by the burner. This type of devices for heating can be used in a central heater for heat and hot water production. The invention also relates to a method for heat exchange between a first medium and a second medium.

PRIOR ART

There are numerous different types of heat exchangers and devices for heating in the prior art. In the heating industry moulded or tube shaped heat exchangers are used for recovering thermal energy from combustion gases, also called combustion heat, which is produced by flame combustion of a mixture of fuel and air. Flame combustion takes place at high temperatures and comprises complex radical reactions in a gas phase. The possibilities to design compact burners and heat exchangers are limited by the combustion technique in which a specific flame length is required to obtain efficient combustion. Further, there is a risk that the flame per se or the flame zone come into direct contact with heat transfer surfaces of the heat exchanger, which will lead to high emissions of carbon monoxide and a risk of destruction of materials. To obtain reasonable durability the solution has generally been to oversize material thicknesses to compensate for these technical problems. Hence, the result is that prior art devices are inefficient, space requiring, heavy and expensive. Hence, there is a need for improved heat exchangers and devices for heating.

SUMMARY OF THE INVENTION

An object of the present invention is to avoid the above mentioned drawbacks and problems of the prior. The invention results in a more efficient recovery of heat from combustion gases and in the possibility of obtaining more compact and cost efficient devices for heating.

The present invention relates to a heat exchanger plate for a plate heat exchanger, comprising a plurality of ports, a first side, a second side and a centre point through which an imaginary centre axis extends in a direction perpendicular to a plane of the plate, wherein the plate comprises a first port for a first medium, and at least a second port and a third port for a second medium, characterised in a sealing arranged on the second side to form a first heat transfer area and a second heat transfer area, wherein the second port is arranged in the first heat transfer area and the third port is arranged in the second heat transfer area. The plate can comprise a first sealing arranged on the second side around the first port, a second sealing arranged on the second side at a circumference of the plate, and a third sealing forming the first heat transfer area and the second heat transfer area, which third sealing for example is closed, wherein the first heat transfer area is separated from the second heat transfer area. By the design of the heat exchanger plate efficient heat transfer from the first medium to the second medium is made possible, wherein overheating, particularly at a rim around the first port, is avoided. In turn this prevents formation of cracks due to thermo-mechanical phenomena and too high temperatures and makes it possible to obtain a long life time of heat exchangers comprising such plates. Further, heat exchange is made possible in which the flow directions are counter current radial and the second medium can flow both in parallel and sequentially through a plate package of a heat exchanger. By the efficient heat transfer boiling of a second medium in the form of, for example, water can be avoided, which also can reduce precipitation of lime compounds. Further, poor condensation of a first medium in the form of combustion gases can be avoided.

The first port can be arranged centrally in the plate and the first heat transfer area can be arranged radially outside the second heat transfer area.

The heat transfer areas can be annular, wherein the second heat transfer area encloses the first port, and the first heat transfer area encloses the second heat transfer area. The first port can be circular. The plate can be circular.

The first side of the plate can be formed with a first pattern to provide a radial flow of the first medium, wherein the second side of the plate can be formed with a different pattern to provide an outer and an inner flow of the second medium.

The second and third ports can be mutually angularly displaced around the centre axis. The plate can also comprise a fourth port arranged for the second medium in the first heat transfer area, and a fifth port arranged for the second medium in the second heat transfer area.

The present invention also relates to a plate heat exchanger comprising a plate package having a first end plate, a second end plate and a plurality of heat exchanger plates as above arranged between them, wherein the plates are arranged to alternatingly form a first interspace between them for the first medium, and alternatingly a second interspace between them for the second medium, wherein the plates are arranged to form a passage in the radial direction between the first ports and the circumference of the plates in the first interspaces, so that the first medium can flow radially between the first port and a position outside the circumference of the plates. At the second end plate the heat exchanger can be arranged with a passage between the second port and the third port, so that the second medium can flow between them. Hence, a compact and efficient heat exchanger for transferring heat from a first medium, such as combustion gases, to a second medium, such as water, is obtained.

Consequently, the heat exchanger can be arranged so that the first medium can flow from the first port in a direction along the plane of the plates and out from the plate package due to that the periphery of the first interspaces is open and form outlet openings for the first medium. Hence, the heat exchanger can be arranged so that the first medium flows out from the first interspaces in a direction perpendicular to the centre axis. A shell can enclose the plate package, so that the first medium can be conducted, for example, in an axial direction in a gap between the periphery of the plate package and the shell and be brought to an outlet in the shell.

The invention also relates to a device for heating, comprising a burner provided with a catalyst to provide the first medium through catalytic combustion of fuel, and a plate heat exchanger as above connected to the burner to transfer heat from the first medium to the second medium. Hence, the first medium is combustion gases and the second medium can be a liquid, such as water. The resulting device is efficient and can be made compact and with long durability.

The burner can comprise an outer cover having an inlet for fuel, and an inner cover having an inlet for the fuel and being arranged in the outer cover to form a space between the outer and the inner covers to guide incoming fuel around the inner cover and to the inlet opening of the inner cover, wherein the catalyst is arranged in the inner cover to provide the first medium in the form of combustion gases. Hence, cooling of the burner is obtained by means of the incoming fuel or mixture of fuel and air, wherein simplified cooling of the burner is obtained to avoid back firing.

The catalyst can be tapered, such as conical or formed as a half sphere or in any other suitable manner, so that the combustion takes place from the outside and into the burner. Further, the device can be arranged so that the combustion takes place from the top and downwards. Thereby, overheating of the covers of the burner is avoided, which covers in addition are cooled by incoming fuel or mixture of fuel and air and also conductively by contact with the heat exchanger.

Further characteristics and advantages of the present invention will become apparent from the description of the embodiments below, the appended drawings and the dependent claims.

SHORT DESCRIPTION OF THE DRAWINGS

Figure 2:
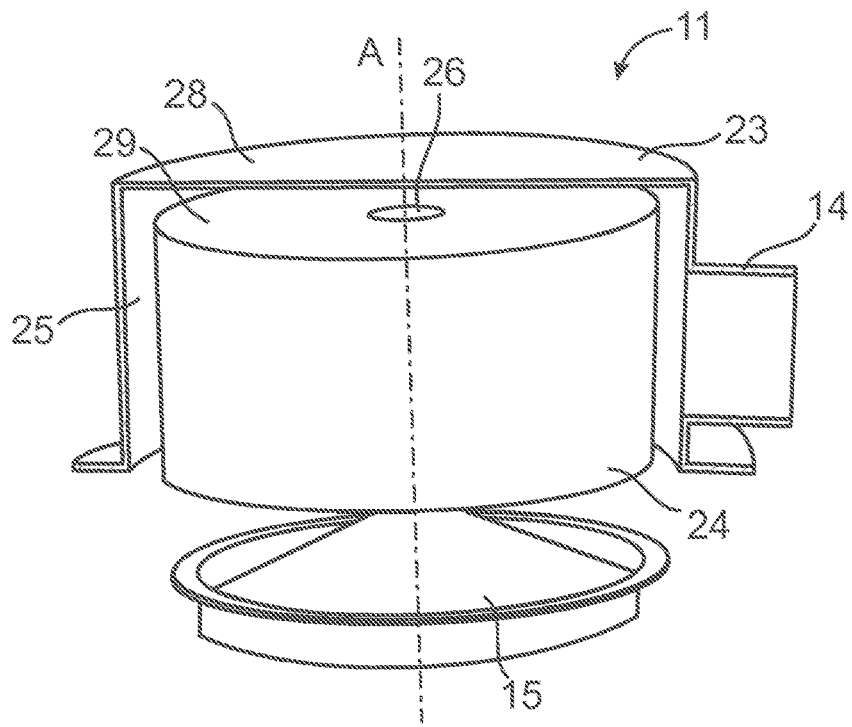
Figure 3:
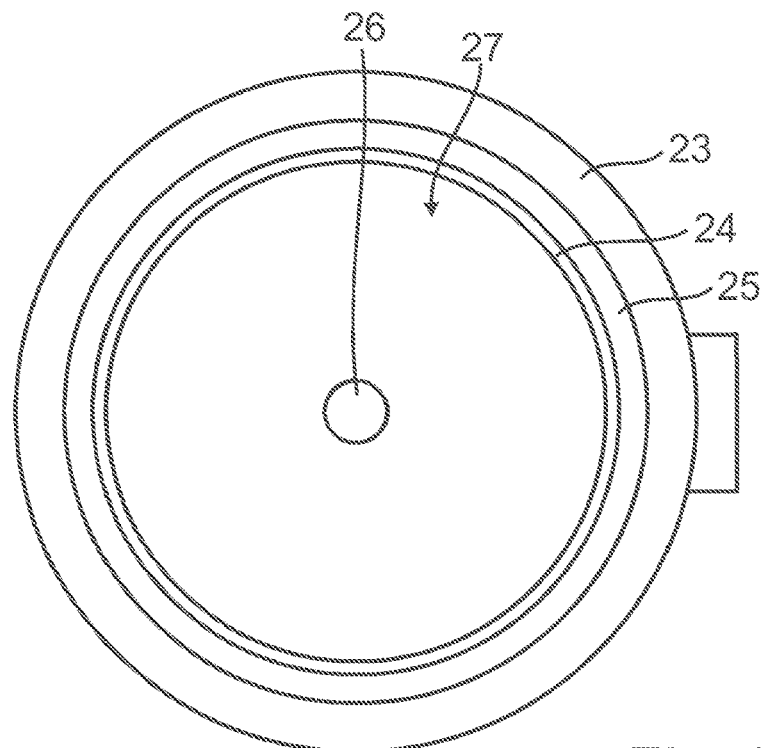
Figure 4:
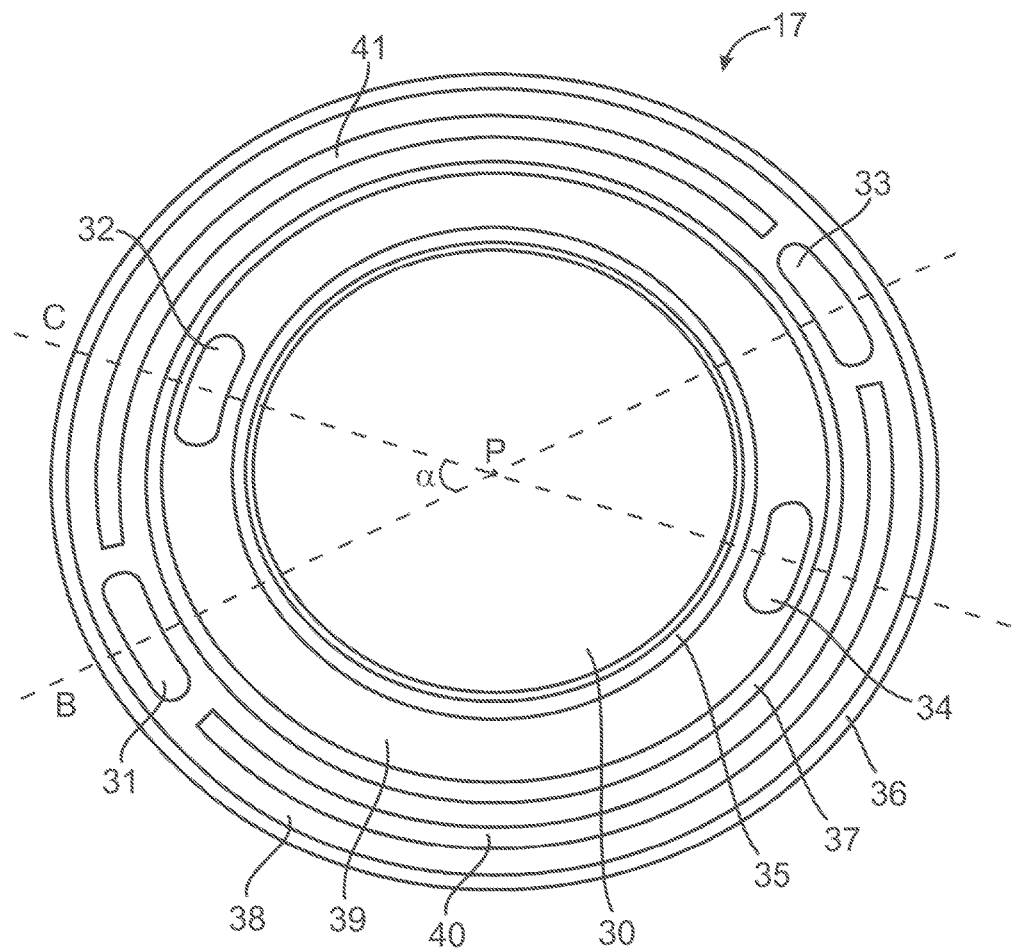
Figure 5:
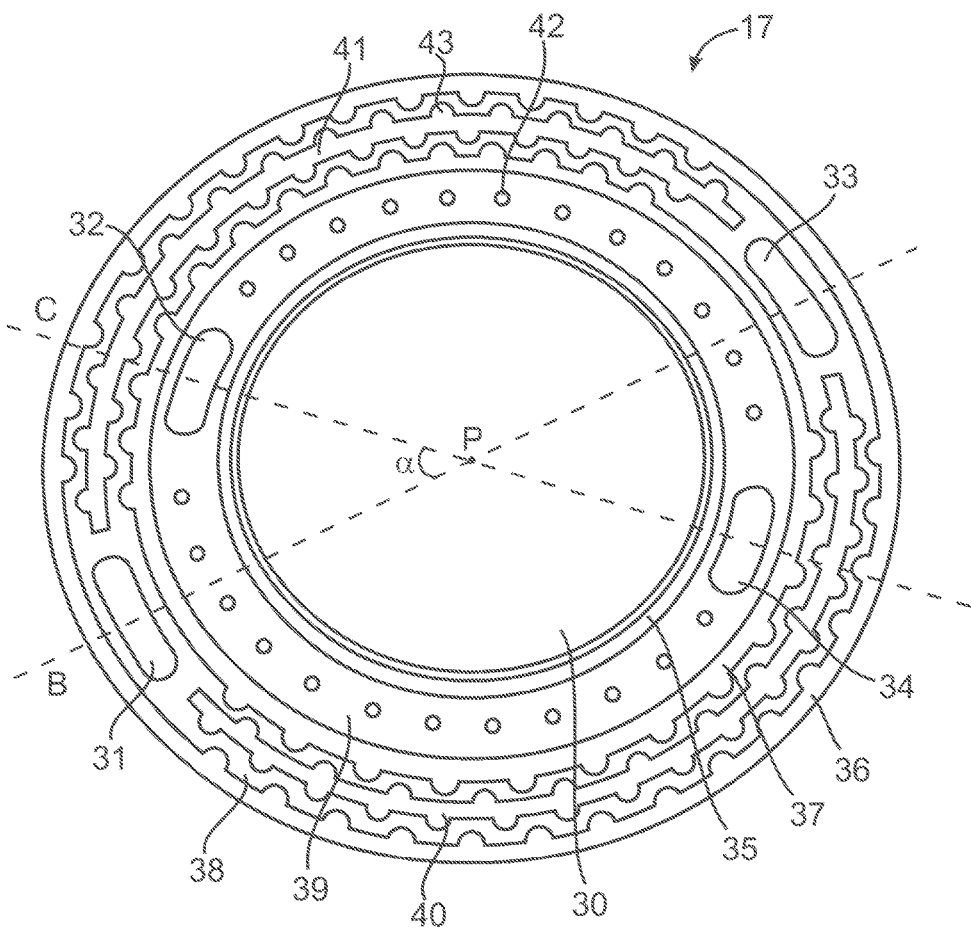
Figure 6:
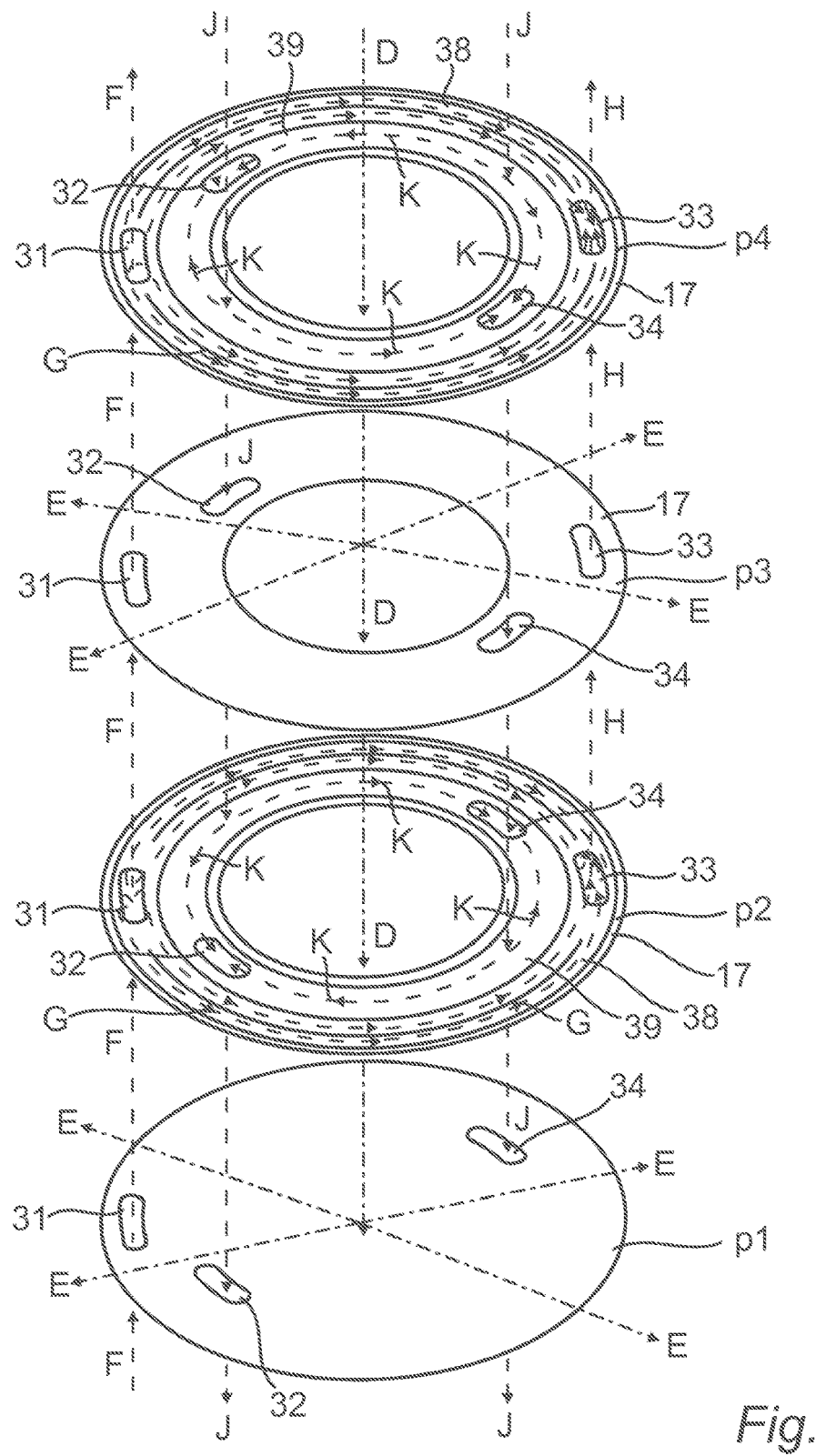
Figure 7:
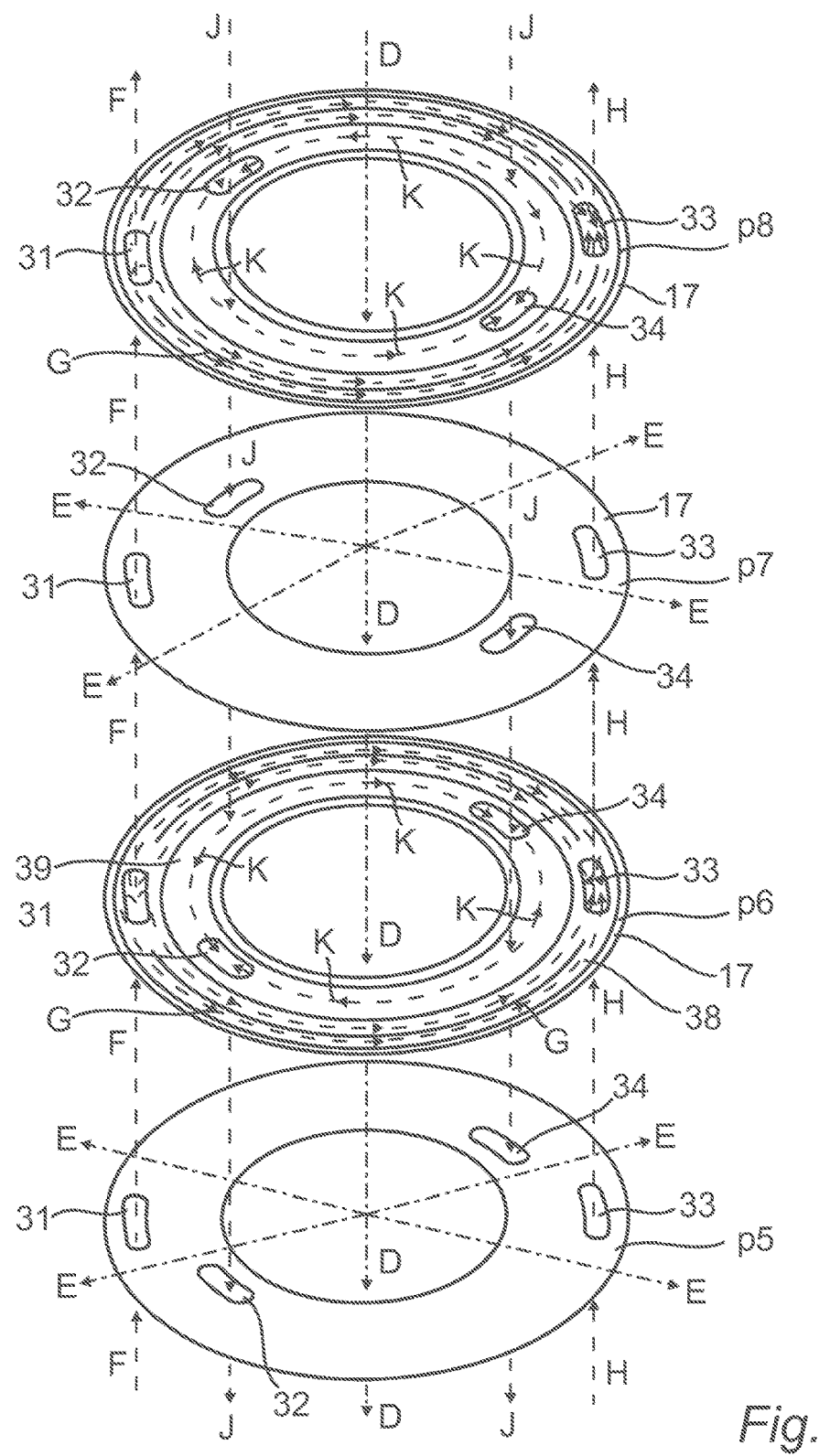
Figure 8:
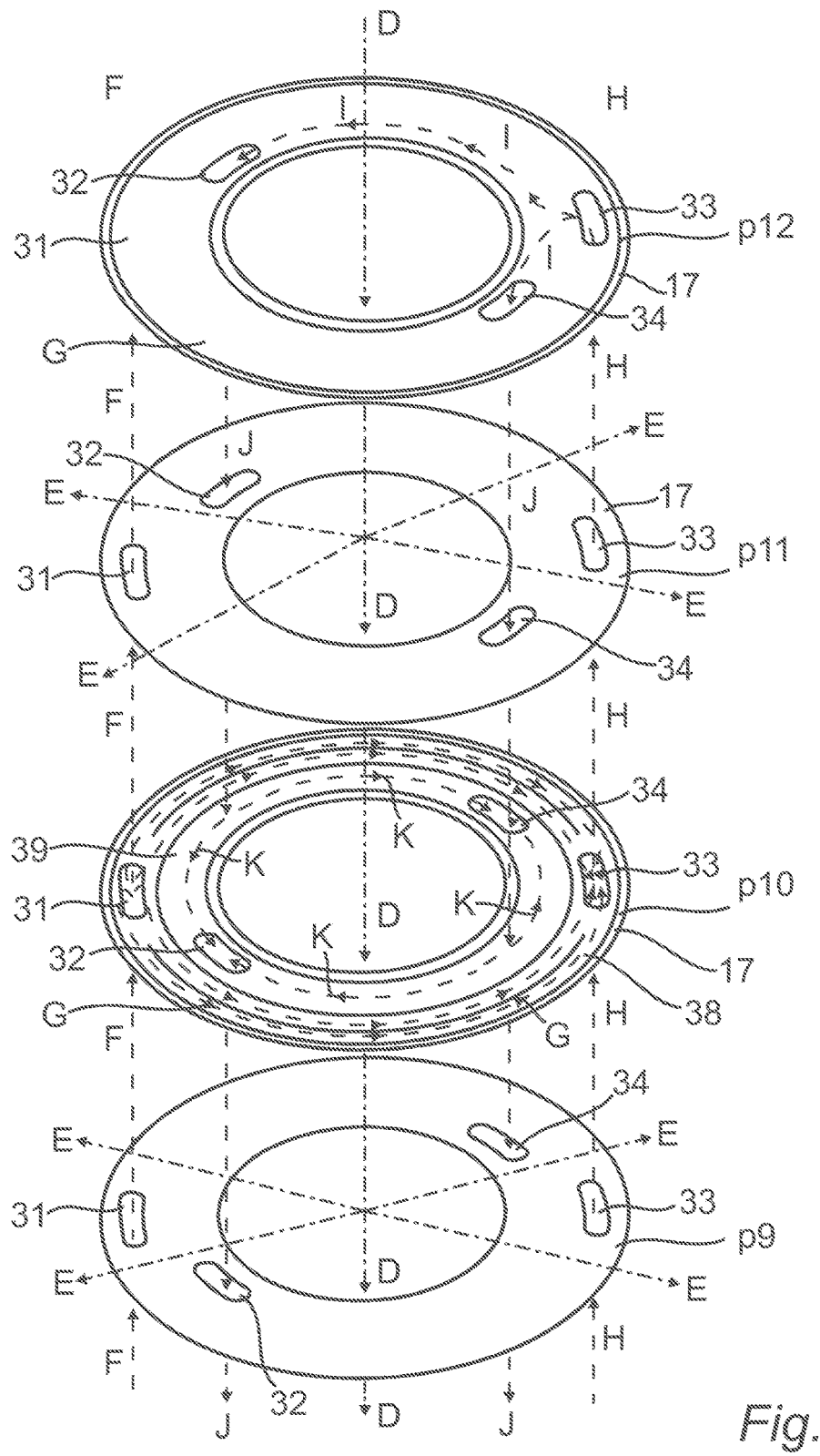
Figure 9:
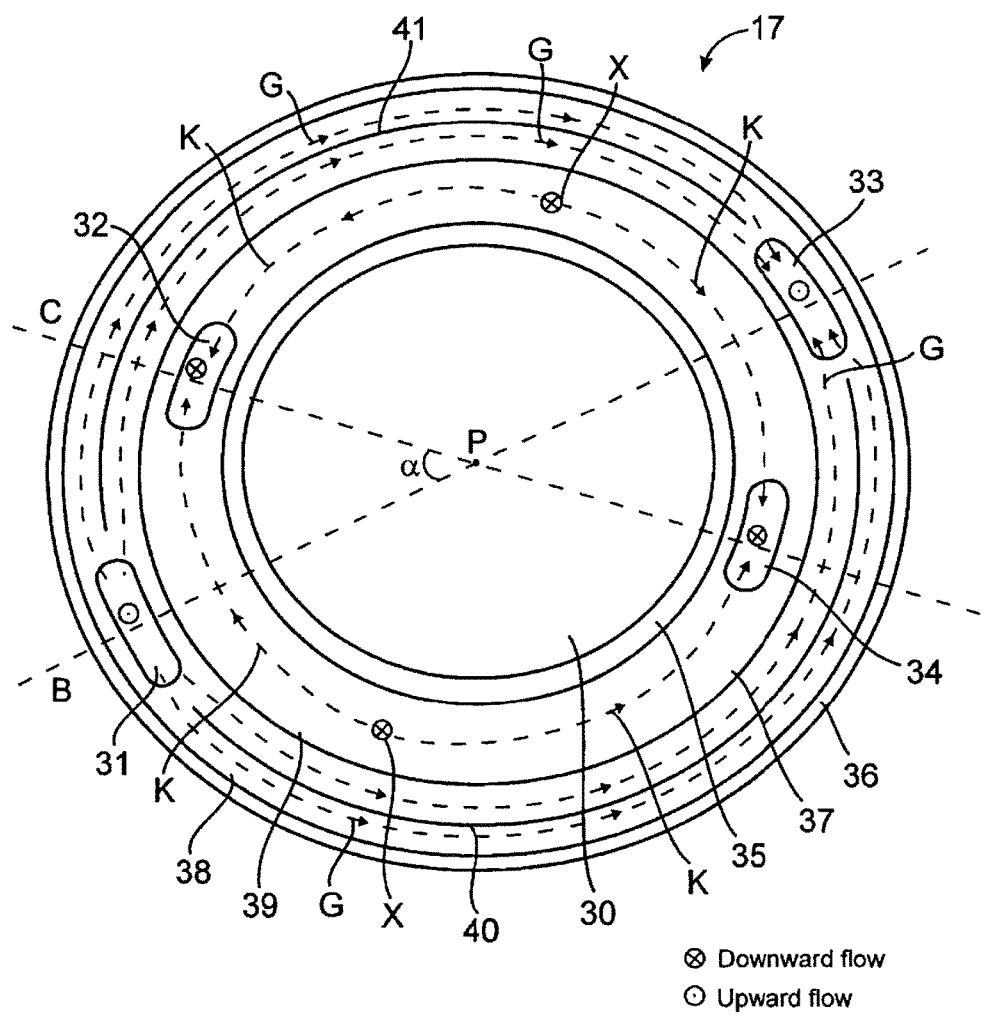
Figure 10:
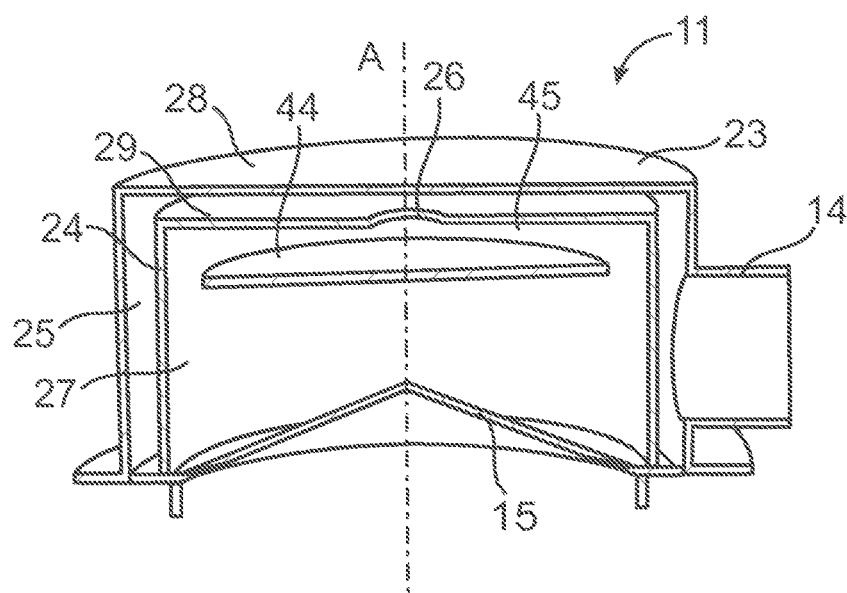
Figure 11:
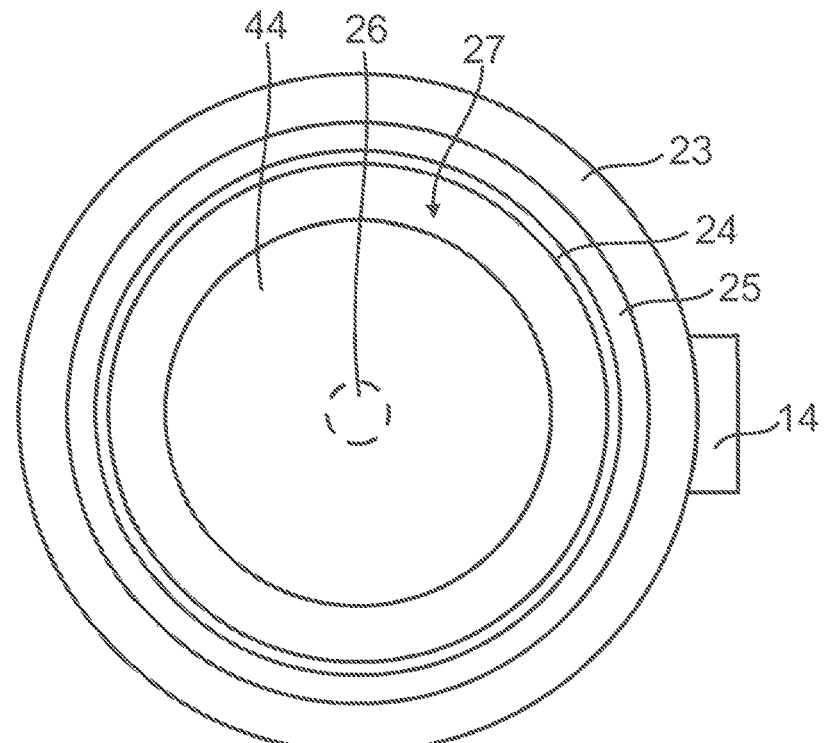

The invention will now be described more in detail with the aid of embodiments and with reference to the appended drawings, in which FIG. 1 is a schematic perspective view of a device for heating according to one embodiment of the present invention, in which a burner, a heat exchanger and a shell of the device have been separated from each other, FIG. 2 is a schematic perspective view, partially in longitudinal section, of the burner of FIG. 1, in which a catalyst of the burner is illustrated separately, FIG. 3 is a schematic longitudinal view of the burner of FIG. 2, in which the catalyst of the burner has been removed, FIG. 4 is a schematic view from above of a heat exchanger plate according to one embodiment of the invention, FIG. 5 is a view from above of a heat exchanger plate according to another embodiment of the invention, FIG. 6 is a schematic exploded perspective view of a first end portion of a heat exchanger according to a basic embodiment of the invention, in which a flow of a first medium is illustrated by means of dash and dot lines and a flow of a second medium is illustrated by means of dashed lines, FIG. 7 is a schematic exploded perspective view of an intermediate portion of a heat exchanger according to FIG. 6, FIG. 8 is a schematic exploded perspective view of a second end portion of a heat exchanger according to FIGS. 6 and 7, FIG. 9 is a schematic view of a second side of a heat exchanger plate according to a basic embodiment of the invention, in which the flow of the second medium is illustrated more in detail, FIG. 10 is a schematic perspective view, partially in longitudinal section, of the burner according to an alternative embodiment, and FIG. 11 is a schematic view in the longitudinal direction of the burner of FIG. 10, in which the catalyst of the burner has been removed.

DETAILED DESCRIPTION OF EMBODIMENTS

Referring to FIG. 1 a device 10 for heating according to one embodiment is illustrated schematically. The device 10 comprises a burner 11, a heat exchanger 12 and a shell 13 for containing the heat exchanger 12. For example, the heat exchanger 12 is a plate package of heat exchanger plates, wherein the plate package and the shell 13 form a plate and shell heat exchanger. For example, the device 10 is arranged for heating a medium, such as a liquid or a gas. For example, the device 10 is arranged for producing heat and hot water in buildings, such as dwelling houses, industry facilities, office buildings and similar. According to one embodiment the device 10 is mounted in a central heater, such as a wall-mounted heating boiler for production of heat and hot water.

The burner 11 comprises an inlet 14 for conducting fuel, such as natural gas or any other suitable type of fuel, into the burner 11. For example, the inlet 14 is arranged for conducting a mixture of fuel and air into the burner 11. Alternatively, the burner 11 is arranged with a separate inlet for air or oxygen, which is not illustrated in the drawings. The burner 11 further comprises a catalyst 15 for catalytic combustion of the fuel. The catalyst 15 is arranged inside the burner 11. In FIG. 1, however, the catalyst 15 is illustrated outside the burner 11. Hence, the burner 11 is arranged for catalytic combustion of the fuel while forming hot combustion gases. The burner 11 further comprises an outlet 16 for the combustion gases. The burner 11 is described more in detail below with reference to FIG. 2 and FIG. 3.

The outlet 16 of the burner 11 is arranged in connection with the heat exchanger 12, so that the combustion gases are conducted to the heat exchanger 12. In the illustrated embodiment the burner 11 and the heat exchanger 12 are arranged along a centre axis A extending through the burner 11 and the heat exchanger 12. For example, the burner 11 is arranged in connection with a first end of the heat exchanger 12. As evident from FIG. 1 the catalyst 15 is conical. Alternatively, the catalyst 15 is arranged in the form of a half sphere or similar. For example, the catalyst 15 is arranged in the form of a net. The heat exchanger 12 comprises a plurality of heat exchanger plates 17 forming a plate package. The heat exchanger plates are described more in detail below. The heat exchanger 12 is arranged for transferring thermal energy from a first medium, such as the combustion gases from the burner 11, and a second medium, such as water or any other suitable medium. In the illustrated embodiment the heat exchanger 12 is formed as a cylinder, such as a cylinder having circular or elliptic bases, wherein the burner 11 is connected to a base of the heat exchanger 12. The heat exchanger 12 comprises an inlet 18 and an outlet 19 for the second medium. For example, the inlet 18 and the outlet extend axially. In the illustrated embodiment the inlet 18 and the outlet 19 extend in parallel to each other and project from a second end of the heat exchanger 12.

In the illustrated embodiment the device 10 comprises ignition means 20, such as a spark plug, heater plug or similar, for initiating the combustion process. The ignition means 20 is, for example, arranged at the second end of the heat exchanger 12, i.e. at the opposite end as the burner 11.

The shell 13 is arranged for receiving the heat exchanger 12. The shell 13 encloses the heat exchanger 12 in the radial direction. In the illustrated embodiment the shell 13 is arranged as a cylinder having a curved surface enclosing the heat exchanger 12, wherein the shell 13 is arranged concentric with the heat exchanger 12. The shell 13 comprises an inlet 21 for combustion gases and an outlet 22. For example, the outlet 22 of the shell 13 is arranged for cooled combustion gases and condensate from cooled combustion gases. Alternatively, the shell 13 comprises a separate condensate outlet for condensate from cooled combustion gases, which is not illustrated in the drawings. The inlet 21 of the shell 13 is arranged in a first end of the shell 13, such as in a first base of the shell 13, to conduct hot combustion gases in the axial direction into the shell 13. The outlet 22 of the shell 13 is, for example, arranged in a second end of the shell 13, such as in a second base of the shell 13, wherein the outlet 22 extends axially. Any condensate outlets are, for example, arranged in a lower portion of the shell 13, so that condensate can flow out by means of gravity.

With reference to FIG. 2 and FIG. 3 the burner 11 is illustrated more in detail. In FIG. 2 the catalyst 15 is illustrated separately and in FIG. 3 the catalyst 15 has been removed. The burner 11 comprises an outer cover 23 and an inner cover 24 arranged within the outer cover 23 to form a space 25 between the outer cover 23 and the inner cover 24. The inlet 14 of the burner 11 is arranged in the outer cover 23 for conducting fuel or a mixture of air and fuel to the space 25. The inner cover 24 is arranged with an opening 26 connecting the space 25 with a chamber 27, such as a combustion chamber, within the inner cover 24, so that the fuel or mixture of fuel and air can be conducted from the space 25 and into the chamber 27. The catalyst 15 is arranged inside the chamber 27 inside the inner cover 24 for combustion of the fuel. The space 25 extends around the inner cover 24, so that incoming fuel or mixture of fuel and air come into contact with an outer side of the inner cover 24 and cool the inner cover 24 before the fuel or mixture of fuel and air is brought into the chamber 27 through the opening 26. Hence, the opening 26 in the inner cover 24 is arranged in an angle to the inlet 14 of the burner 11. For example, the outer cover 23 is formed as a cylinder having smaller diameter than the outer cover 23. In the illustrated embodiment, the inner cover 24 is arranged concentric with the outer cover 23 to form the space 25 between an outer curved surface of the inner cover 24 and an inner curved surface of the outer cover 23. Hence, the space 25 extends in the radial direction. Further, in the illustrated embodiment the inner cover 24 is arranged at a distance from a first end 28 or a first base of the outer cover 23, wherein the space 25 is arranged also between the first end 28 of the outer cover 23 and a first end 29 of the inner cover 24. Hence, the space 25 also extends in the axial direction between the first end 28 of the outer cover 23 and the first end 29 of the inner cover 24. The opening 26 in the inner cover 24 is, for example, arranged in the first end 29 of the inner cover 24. For example, the opening 26 is circular and is, for example, arranged centrally in the first end 29 of the inner cover 24. For example, the first end 28 of the outer cover 23 is an upper end of the device 10.

The catalyst 15 projects into the chamber 27 from a second end, such as a lower end, of the inner cover 24. For example, the catalyst 15 is arranged concentric with the inner cover 24. The catalyst 15 is, in the illustrated embodiment, tapered, such as conical or shaped as a half sphere or similar, so that a thinner portion of the catalyst 15 is arranged further into the chamber 27 than a wider portion of the catalyst 16. For example, the wider portion of the catalyst 15 is arranged in connection with the second end of the inner cover 24 and in a direction towards the heat exchanger 12.

With reference to FIG. 4 a heat exchanger plate 17 according to one embodiment is illustrated. For example, the plate 17 is formed in sheet metal. For example, the plate 17 is formed in steel, such as 304, 304L, 316 or similar steel quality, aluminium or any other suitable material. A thickness of the sheet metal is, for example, 0.2-1 mm, 0.4-0.6 mm or 0.5 mm. For example, the plate 17 is formed by pressing. In the illustrated embodiment the plate 17 is circular. Alternatively, the plate 17 is elliptic.

The plate 17 comprises a first side, a second side and a centre point P through which the centre axis A of the heat exchanger 12 extends, which centre axis A is illustrated in FIG. 1. Hence, the centre axis A extends perpendicular to a plane of the plate 17. The first side, which is not illustrated in FIG. 4, is arranged for engaging the first medium, while the second side, which is illustrated in FIG. 4, is arranged for engaging the second medium. For example, the plate 17 is arranged with a first pattern on the first side and a second pattern on the second side.

The plate 17 comprises a first port 30, a second port 31 and a third port 32. In the illustrated embodiment the plate 17 also comprises a fourth port 33 and a fifth port 34. The first port 30 is arranged for the first medium while the remaining ports 31-34 are arranged for the second medium. The first port 30 is arranged centrally in the plate 17 and is, for example, circular. For example, the first port 30 is arranged concentric in the plate 17. Remaining ports 31-34 are arranged between the first port 30 and a circumference of the plate 17.

The first side is arranged for providing a radial flow of the first medium between the first port 30 and a position beyond the circumference of the plate, which is described in more detail below. The second side comprises a first sealing 35 around the first port 30, a second sealing 36 at the circumference of the plate 17, and a third sealing 37 arranged between the first sealing 35 and the second sealing 36. The first sealing 35 encloses the first port 30 to prevent the first medium from engaging the second side of the plate 17. The second sealing 36 extends continuously around the circumference of the plate 17 to prevent the second medium from leaking in the radial direction. For example, the second sealing 36 is a gasket. Alternatively, the second sealing 36 is provided in any other manner, such as through welding or soldering of adjacent plates 17 of a heat exchanger 12. The third sealing 37 extends in a continuous ring forming a first heat transfer area 38 and a second heat transfer area 39 separated from the first heat transfer area 38. The second port 31 and, if applicable, the fourth port 33 are arranged in the first heat transfer area 38. The third port 32 and, if applicable, the fifth port 34 are arranged in the second heat transfer area 39. The first and second heat transfer areas 38, 39 are arranged for the second medium. Hence, the second heat transfer area 39 is arranged between the first port 30 and the first heat transfer area 38. For example, the first and second heat transfer areas 38, 39 are annular, wherein the first heat transfer area 38 encloses the second heat transfer area 39, so that the first heat transfer area 38 is arranged radially outside the second heat transfer area 39. Hence, radially the first heat transfer area 38 forms an outer heat transfer area while the second heat transfer area 39 radially forms an inner heat transfer area. The second and fourth ports 31, 33 are arranged radially outside the third and fifth ports 32, 34.

In the illustrated embodiment the second and fourth ports 31, 33 are arranged opposite each other on opposite sides of the centre point P and the centre axis A. The centre axis A extends through the centre point P. The second and fourth ports 31, 33 are arranged on an imaginary first line B extending through the centre point P and in the plane of the plate 17. Also the third and fifth ports 32, 34 are arranged opposite each other on opposite sides of the centre point P. The third port 32 and the fifth port 34 are arranged on an imaginary second line C extending through the centre point P and in the plane of the plate 17. The second line C is displaced around the centre point P in relation to the first line B forming an angle α between them, so that the third and fifth ports 32, 34 are angularly displaced around the centre point P in relation to the second and fourth ports 31, 33. The angle α between the first line B and the second line C is between 0 and 90 degrees, 10-80 degrees or 20-70 degrees.

In the illustrated embodiment the first heat transfer area 38 is provided with a first divider 40 and a second divider 41 forming two substantially parallel passages on both sides of the centre point P and between the second port 31 and the fourth port 33.

The first side of the plate 17, which is not illustrated in FIG. 4, is, for example, provided with a sealing around the second, third, fourth and fifth ports 31-34 to prevent the second medium from being mixed with the first medium.

With reference to FIG. 5 another embodiment of the plate 17 is illustrated, in which the plate 17 is provided with a pattern to obtain specific heat transfer and flow properties. In the embodiment of FIG. 5 the second side of the plate 17 is illustrated. In the embodiment of FIG. 5 the plate 17 is provided with indentations 42 and embossments 43.

The second side of the plate 17 is arranged for engaging the second medium. For example, the second medium is arranged for recovering heat from the first medium. For example, the second side of the plate 17 is provided with a porous layer, such as a porous metal or ceramic material, forming an enlarged specific surface area of the second side of the plate 17 for efficient heat transfer and efficient cooling of the heat exchanger 12. For example, a catalyst is arranged in the porous layer, such as for the production of hydrogen gas.

With reference to FIGS. 6-8 a plate package of a heat exchanger 12 is illustrated schematically, wherein a first end portion of the plate package is illustrated in FIG. 6, an intermediate portion of the plate package is illustrated in FIG. 7 and a second end portion of the plate package is illustrated in FIG. 8. In FIGS. 6-8 the plates 17 are numbered consecutively with p1-p12. In FIGS. 6-8 the flow of the first medium is illustrated by means of dash and dot lines while the flow of the second medium is illustrated by means of dashed lines. In FIG. 9 the flow of the second medium along the second side of the plate 17 is illustrated more in detail.

The heat exchanger 12 comprises a plurality of plates 17, which are arranged to form interspaces between them for the first and second medium. The plates 17 are arranged to alternatingly form the first interspace for the first medium and the second interspace for the second medium. Adjacent plates 17 interact to form said interspaces. For example, the plates 17 are arranged with their first sides facing each other and their second sides facing each other. For example, the plates 17 are interconnected through welding, such as laser welding, forming a welded heat exchanger 12, such as a laser welded heat exchanger. Alternatively, the plates 17 are interconnected through soldering forming a soldered heat exchanger 12. For example, the heat exchanger 12 comprises a corrosion resistant solder to withstand an acid condensate in the heat exchanger, such as due to cooling combustion gases from combustion of natural gas or similar. If the heat exchanger 12 is arranged so that condensate is not formed or the cooling does not result in acid condensate a regular solder can be used. Alternatively, the plates 17 are provided with a polymer, being melted together in adjacent plates 17 to connect the plates 17 to each other and form the heat exchanger 12.

The heat exchanger 12 comprises a first end plate p1, a second end plate p12 and a plurality of intermediate plates p2-p11 arranged between them. The intermediate plates p2-p11 are, for example, arranged according to the embodiments of FIG. 4 or FIG. 5.

The plates p2-p12 are arranged so that the first ports 30 are facing each other to form a channel for the first medium, so that the first medium is conducted in the axial direction into the heat exchanger 12, such as through the second end plate 12, and in the axial direction through the heat exchanger 12 through the first ports 30, which is illustrated by means of the arrows D in FIGS. 6-8. Alternatively, the first medium is conducted into the heat exchanger 12 in another optional direction. Inside the heat exchanger 12 the first medium is conducted in the radial direction through the first interspaces between the plates p1-p12, which is illustrated by means of the arrows E in FIGS. 6-8. Hence, the first interspaces lack the first sealing 35 and the second sealing 36 while they are provided with sealings around the second, third, fourth and fifth ports 31-34. The first end plate p1 lacks, for example, the first port 30 to force the first medium in the radial direction out from the heat exchanger 12 through the first interspaces. For example, the axial flow of the first medium is directed substantially vertically downwards. For example, the first medium is conducted from the burner 11 and into the heat exchanger 12 through the inlet 21 of the shell 13, which is illustrated in FIG. 1. After leaving the circumference of the plates p1-p12 the first medium is collected, for example in the shell 13, and conducted out through the outlet 22 of the shell 13.

In the illustrated embodiment the plates p1-p11 are arranged so that the second ports 31 are facing each other forming a channel in the axial direction for the second medium. Alternatively, the plates are arranged in pairs and rotated 180 degrees in their planes. The second port 31 of the first end plate p1 is connected to the inlet 18 of the heat exchanger 12, so that the second medium can be brought into the heat exchanger 12 and through the channel formed by the second ports 31, which is illustrated by means of the arrows F. For example, the second medium is conducted substantially vertically upwards through the second ports 31. The second medium passes the first interspaces in a conventional manner by means of sealings around the ports and is conducted into the second interspaces. In the second interspaces the second medium is conducted along the plane of the plates, along the first heat transfer area 38 and up to the fourth ports 33, which is illustrated by means of the arrows G. Alternatively, the plates p1-p12 are arranged in pairs wherein every other pair has been rotated 180 degrees in their planes, wherein the fourth ports 33 can be omitted. In the illustrated embodiment the fourth ports 33 are arranged towards each other to form an axially extending channel for the second medium, so that the second medium can be conducted through them, which is illustrated by means of the arrows H, to the second end plate 12. The second end plate p12 is covered by a frame plate or similar, which is not illustrated in FIG. 8. In the illustrated embodiment the second end plate p12 comprises the fourth port 33 but lacks the third sealing 37, so that the second medium is conducted from the fourth port 33 in a direction along the plane of the second end plate p12 and in a direction radially inwards to the third port 32 and, in the illustrated embodiment, also the fifth port 34, which is illustrated by means of the arrows I in FIG. 8. Hence, in one end the heat exchanger 12 is arranged with a passage between the first heat transfer area 38 and the second heat transfer area 39, so that the second medium can be conducted from the second and fourth ports 31, 33 to the third and fifth ports 32, 34. The third ports 32 and the fifth ports 34 of two adjacent plates are arranged opposite each other, so that the second medium can be conducted in the axial direction through the first interspaces and into the second interspaces, as illustrated by means of the arrows J. In the second interspaces the second medium is conducted along the plane of the plates and along the second heat transfer area 39, which is illustrated by means of the arrows K. Hence, the flow of the second medium is brought to turn 180 degrees in the axial direction while being conducted in the radial direction, such as radially inwards. Hence, seen from a radial perspective the heat exchanger 12 is arranged to provide an outer flow in a first axial direction of the second medium through the second port 31, the first heat transfer area 38 and the fourth port 33, and an inner flow in an opposite second axial direction of the second medium through the second heat transfer area 39, the third port 32 and the fifth port 34. For example, the second medium flows through a radially outer part of the heat exchanger 12 in the opposite direction as the first medium while the second medium flows through a radially inner part of the heat exchanger 12 in the same direction as the first medium. For example, the flow of the second medium through a radially outer part of the heat exchanger 12 is an upwards flow while the flow of the second medium in a radially inner part of the heat exchanger 12 is a downwards flow.

In the illustrated embodiment the plates p1-p12 are arranged in pairs wherein the third ports 32 are facing each other and the fifth ports 34 are facing each other, so that the second medium can pass the first interspaces. However, the third and fifth ports 32, 34 of adjacent pairs of plates are angularly displaced around the centre axis A of the heat exchanger 12 in relation to each other, so that the second medium is forced through at least a part of the second heat transfer area 39 before proceeding to the next second interspace. For example, pairs of intermediate plates p2-p11 are formed by plates being mirror-inverted with reference to the third and fifth ports 32, 34.

The third port 32 of the first end plate p1 is connected to the outlet 19 of the heat exchanger 12. For example, the first end plate p1 comprises also the fifth port 34, which fifth port 34 is connected to the outlet 19 or a second outlet of the heat exchanger 12, which second outlet is not illustrated in the drawings.

With reference to FIG. 9 the flow of the second medium in the second interspaces between the plates 17 or along the second side of the plates is illustrated more clearly. In the illustrated embodiment the second medium is conducted through the second port 31, wherein a part of the second medium is conducted from the second port 31, along the first heat transfer area 38, as illustrated by means of the arrows G, and out through the fourth port 33 of an adjacent plate 17 while forming the radially outer flow of the second medium.

A part of the second medium can also be brought to pass through the fourth port 33. By the first divider 40, which extends between the second and fourth ports 31, 33, the flow of the second medium is divided in the first heat transfer area 38 into two parallel and substantially semicircular passages between the second and fourth ports 31, 33. Correspondingly, the second divider 41 results in two parallel passages for the second medium on the other side of the first port 30.

After the second medium has been brought to turn 180 degrees in the axial direction the second medium is conducted into the second interspaces and along the second heat transfer area 39, as illustrated by means of the arrows K, to form the radially inner flow of the second medium. Hence, the inner flow of the second medium is in opposite axial direction as the outer flow thereof and is, for example, in the same direction as the axial flow of the first medium. The inner flow of the second medium is brought into the second interspaces and into contact with the second heat transfer area 39 of the next plate 17 in positions X, which are displaced in relation to the third and fifth ports 32, 34. Hence, the positions X are arranged between the third and fifth ports 32, 34, wherein the second medium is forced to flow from the positions X in a first direction towards the third port 32 and in the opposite direction towards the fifth port 34 and then further on to the next second interspace in a similar way.

One embodiment comprises a method for heating by means of the device 10. For example, the method is intended for heating of the second medium, such as a liquid or water for hot water production in a boiler or similar. For example, the method comprises the steps of burning fuel or a mixture of fuel and air in a burner 11 catalytically to provide the first medium in the form of hot combustion gases, conducting the first medium into the heat exchanger 12 and bringing the first medium in the axial direction through the heat exchanger 12 and in the radial direction through the first interspaces of the heat exchanger 12, conducting the second medium into the second interspaces of the heat exchanger 12 and bringing the second medium to flow through the heat exchanger in a first axial direction and then radially displaced in the opposite axial direction. For example, the second medium is brought to flow in a radially outer flow and then in an inner flow while the first medium is conducted from the centrally positioned first port 30 and outwards in the radial direction. For example, the second medium is conducted through the heat exchanger 12 so that thermal energy from the first medium first is transferred to the radially inner flow of the second medium and then to the outer flow thereof. For example, the method comprises steps for conducting fuel into the burner 11 while simultaneously cooling the inner cover 24 of the burner, which is described with reference to FIG. 2 and FIG. 3. For example, the method comprises steps for conducting the first and second medium through the heat exchanger 12 and along the plates 17 as described with reference to FIGS. 4-9.

With reference to FIG. 10 and FIG. 11 the burner 11 is illustrated according to an alternative embodiment. The burner 11 comprises the inlet 14, the catalyst 15, the outlet 16, the outer cover 23, the inner cover 24, the space 25 and the opening 26 connecting the space and the chamber 27, as described above with reference to FIGS. 2 and 3. In the embodiment of FIGS. 10 and 11 a guiding device 44 is arranged inside the inner cover 24 in front of the opening 26. The opening 26 is illustrated by means of a dashed line in FIG. 11. The guiding device 44 is arranged to guide the incoming flow of fuel towards the circumference of the inner cover 24 to obtain efficient combustion and avoid backfiring of the fuel while simultaneously cooling the circumference of the inner cover 24 and screening off the first end 28, 29 of the covers 23, 24 from the combustion. For example, the guiding device 44 is formed as a plate arranged within the first end 29 of the inner cover 24 and coaxially with the opening 26 to form a gap 45 between the guiding device 44 and the first end 29 of the inner cover 24. Hence, the guiding device 44 is arranged at a distance in the axial direction from the first end 29 of the inner cover 24 to form the gap 45, so that the incoming fuel can flow axially through the opening 26 and up to the guiding device 44, after which the fuel is forced to flow radially towards the inner curved surface of the inner cover 24 before the fuel reaches the catalyst 15. The guiding device 44 is, for example, a circular plate having a diameter being smaller than the diameter of the inner cover 24. For example, the gap is 1-10 mm or 2-5 mm.

The invention claimed is:

1. A plate heat exchanger, comprising:
a plate package having a first end plate, a second end plate and a plurality of heat exchanger plates arranged between the first end plate and the second end plate, the first end plate, the second end plate and the heat exchanger plates each comprising a first side, a second side and a center point through which an imaginary center axis extends in a direction perpendicular to a plane of at least the heat exchanger plates, and the second end plate and the heat exchanger plates each comprising a first port for a first medium, at least the first end plate and the heat exchanger plates each comprising at least a second port for a second medium and the first end plate, the second end plate and the heat exchanger plates each comprising a third port for the second medium;
the first side having a sealing around the second port and the third port,
a first sealing arranged on the second side, around the first port, a second sealing arranged on the second side, at an outer circumference of the heat exchanger plates and a third sealing is arranged between the first sealing and the second sealing to form a first heat transfer area and a second heat transfer area,
wherein the second port is arranged in the first heat transfer area and the third port is arranged in the second heat transfer area,
wherein the second heat transfer area is arranged for cooling the heat exchanger plates around the first port,
wherein at least the heat exchanger plates that are adjacent to each other are arranged to form a first interspace between the first side thereof for the first medium and a second interspace between the second side thereof for the second medium,
wherein the heat exchanger plates are arranged to form a passage in the radial direction between the first port of each of the heat exchanger plates and a circumference of the heat exchanger plates in the first interspace, so that the first medium can flow radially between the first port of each of the heat exchanger plates and a position outside the circumference of the heat exchanger plates in the first interspace,
wherein the second end plate comprises a passage between the first heat transfer area and the second heat transfer area so that the second medium can flow between the first heat transfer area and the second heat transfer area, and such that the flow of the second medium through a radially outer part of the heat exchanger is an upward flow while the flow of the second medium in a radially inner part of the heat exchanger is a downward flow; and
wherein the heat transfer plates are arranged in pairs such that the third port of the heat exchanger plates that define the second interspace are displaced around the center axis in relation to each other.

2. The plate heat exchanger according to claim 1, wherein the first port of each of the second end plate and the heat exchanger plates is arranged in line with the first port of an adjacent plate and the second port of each of the first end plate and the heat exchanger plates is arranged in line with the second port of an adjacent plate.

3. The plate heat exchanger according to claim 1, wherein the plate package is arranged in a shell forming a plate and shell heat exchanger.

4. The plate heat exchanger according to claim 1, wherein the first port is arranged centrally in each of the heat exchanger plates and the second heat transfer area is arranged between the first port and the first heat transfer area.

5. The plate heat exchanger according to claim 1, wherein the heat exchanger plates and the first heat transfer area and the second heat transfer area are annular and the first port is circular.

6. The plate heat exchanger according to claim 1, wherein the first side of the heat exchanger plates is arranged in a first pattern and the second side of the heat exchanger plates is arranged in a second pattern that is different from the first pattern.

7. The plate heat exchanger according to claim 1, wherein the heat exchanger plates each comprise a fourth port arranged for the second medium in the first heat transfer area and a fifth port arranged for the second medium in the second heat transfer area,
wherein the second port and the fourth port are arranged on an imaginary first line extending through the center axis, in the plane of each of the heat exchanger plates and on opposite sides of the center axis,
wherein the third port and the fifth port are arranged on an imaginary second line extending through the center axis, in the plane of each of the heat exchanger plates and on opposite sides of the center axis, and
wherein the second line is displaced around the center axis in relation to the first line to form an angle between them.

8. The plate heat exchanger according to claim 7, wherein the angle between the first line and the second line is between 0 and 90 degrees, 10-80 degrees or 20-70 degrees.

* * * * *